United States Patent [19]

Bailey et al.

[11] Patent Number: 4,907,565
[45] Date of Patent: Mar. 13, 1990

[54] HIGH PRESSURE GASIFIER AND DIESEL CYCLE INTERNAL COMBUSTION ENGINE SYSTEM

[75] Inventors: John M. Bailey, Dunlap; Abraham L. Zadoks, Peoria, both of Ill.

[73] Assignee: Caterpillar Inc., Peoria, Ill.

[21] Appl. No.: 313,694

[22] Filed: Feb. 22, 1989

[51] Int. Cl.⁴ .............................................. F02B 45/00
[52] U.S. Cl. ......................................... 123/23; 123/3;
123/27 GE; 48/77; 48/101; 60/39.12
[58] Field of Search ................. 123/3, 23, 27 GE, 299;
48/76, 77, 61, 197 R, 206, 101; 60/39.12

[56] References Cited

U.S. PATENT DOCUMENTS

| | | | |
|---|---|---|---|
| 887,989 | 5/1908 | Weber | 123/3 |
| 2,107,792 | 2/1938 | Huesby | 123/299 |
| 2,799,255 | 7/1957 | Gehres | 123/1 R |
| 4,056,080 | 11/1977 | Rutz et al. | 123/23 |
| 4,310,333 | 1/1982 | Schmidt et al. | 48/101 |
| 4,558,664 | 12/1985 | Robben | 123/23 |
| 4,722,303 | 2/1988 | Leonhard | 123/3 |
| 4,782,794 | 11/1988 | Hsu et al. | 123/23 |

OTHER PUBLICATIONS

DOE/METC-88/6094 "Modeling Diesel Performance with Alternative Fuels", by Kenneth R. Stone, Proceedings of the Annual Coal Fuel Heat Engines and Gas Stream Cleanup Systems Contractors Review Meeting, Excerpts, pp. 140-149.
DE-AH21-87MCO5095, "Computer Model Documentation for GFSIM Coal-Fueled Diesel: Cycle Simulation with Provisions for Gas Fuels", by J. A. Caton, Dept. of Mech. Engrg., Texas A&M University, College Station, Texas, published: Dec. 1987.
DOE/METC-85/6023, "Coal-Fueled Gas Turbine Systems", by General Electric Co., Gas Turbine Division, Proceedings of the Second Annual Heat Engines Contractors Meeting, excerpts: pp. 6-17.
"Cat gets $4 Million contract":, Peoria Journal Star Newspaper, published 8/24/88, excerpt: p. C8, col. 3.
"Cat researches coal converter", Peoria Journal Star Newspaper, published 8/25/88, excerpt: p. C7.
"Researchers Develop Diesel Locomotive that Runs on Coal", Wall Street Journal Newspaper, published: 8/25/88, excerpt: p. C7.

*Primary Examiner*—Noah P. Kamen
*Attorney, Agent, or Firm*—Anthony N. Woloch

[57] ABSTRACT

An improved gasifier and engine system which includes an air compressor, a fixed-bed gasifier, a gas cleansing device and a diesel-cycle internal combustion engine. Ambient air is compressed by the compressor to a predetermined first pressure and is directed to a chamber of the gasifier which contains a batch loaded charge of coal and/or other expendable conditioning materials such as water, limestone and sand. The gasifier partially burns the charge and produces high pressure and temperature fuel gas which is cleaned up prior to exiting the gasifier chamber. The cleaned hot fuel gas is directed to the engine where an injection device injects the fuel gas into a combustion chamber of the engine during a later portion of a compression phase of the diesel cycle. The injected fuel gas is ignited in the engine combustion chamber by a glow plug or other ignition-assist device. The remains of the burned charge in the gasifier chamber are removed, along with the contaminated or reacted conditioning materials, and replaced by a fresh charge. The subject invention provides a feasible way of continuously fueling an internal combustion engine with gasified fossil fuel and is compact enough to be practical for even mobile applications.

13 Claims, 3 Drawing Sheets

Fig_1

HIGH PRESSURE GASIFIER AND DIESEL CYCLE INTERNAL COMBUSTION ENGINE SYSTEM

TECHNICAL FIELD

The present invention relates generally to direct injection gaseous-fueled internal combustion engines and, more particularly to such engines fueled by gasified fossil fuels such as coal.

BACKGROUND ART

There is a great deal of interest at the present time in the development of an engine that can burn coal in a clean and efficient manner. Coal currently costs only about $1.70 per million British Thermal Units (BTU's) compared with diesel fuel at about $4.00 per million BTU's. Moreover, coal is still an abundant natural resource in the United States of America (U.S.) as well as certain other countries and can therefore help satisfy fuel requirements over the next several hundred years. Thus, coal is attractive because of its relatively lower cost and because it can provide independence from imported petroleum. Another reason for the interest in the use of coal, especially in locomotive engines, is that U.S. railroad companies own a significant amount of coal reserves.

For the above reasons, the U.S. government has been spending a significant amount of money in recent years on the development of gas turbine and reciprocating engines which can use coal as a fuel. Unfortunately, efforts to date in this direction have not been very successful because of either severe engine wear problems and/or because of the bulk and complexity of conventional coal-fueled engine systems.

Basically, there are three ways in which coal has been used to produce power, namely, (1) feeding coal to external combustion engines which generally operate on the Rankine cycle, (2) injection of coal dust or slurry into a gas turbine engine or diesel-cycle internal combustion engine or, alternatively, ingestion of coal dust into a diesel-cycle engine's intake air, and (3) gasification of the coal and use of the coal gas as a fuel for a modified diesel-cycle engine, gas engine, or gas turbine engine.

The use of coal in an external combustion engine which operates on the Rankine cycle dates back to the beginning of the industrial revolution which occurred in the late eighteenth century. This type of powerplant, in which coal is burned to create steam to operate a reciprocating engine, was extensively used in both mobile and stationary applications. Unfortunately, while a steam powerplant of this type can be used in vehicles, its maximum efficiency is limited to about 15%. Very large Rankine-cycle powerplants having steam turbines are widely used today for the generation of electrical power. While such powerplants have reasonable efficiency for that application, they are not suitable for mobile applications.

The use of a coal slurry as a fuel for diesel-cycle engines is shown, for example, in U.S. Pat. No. 4,558,664 issued to Robben on Dec. 17, 1985 and U.S. Pat. No. 4,782,794 issued to Hsu et al. on Nov. 8, 1988. The use of fumigated coal dust as a fuel for diesel engines is shown, for example, in U.S. Pat. No. 4,056,080 issued to Rutz et al. on Nov. 1, 1977. Neither of these methods have produced much success. While an engine will operate on these fuels with reasonable efficiency, especially at lower speeds, the coal particles and ash cause combustion cylinder wear which is about 50 to 100 times greater than that experienced with diesel fuel. In addition, wear and other problems associated with the fuel system appear to be very difficult to overcome. Consequently, it is not felt that these approaches have a very good long-range potential.

Powerplants which combine a coal gasifier with a reciprocating Otto-cycle engine or gas turbine engine have been known for many years. In the case of a powerplant utilizing a gas turbine engine, coal has been gasified at about 20 atmospheres pressure. After it exits the gasifier, the coal gas is cleaned by various means such as filters for removing particulate matter and zinc ferrite pellet beds for removing sulfur while the temperature of the coal gas is still near the temperature at which it exited the gasifier. The hot cleaned gas, still at about 20 atmospheres pressure, is then injected into the combustor of the gas turbine engine. Operation of the gasifier at the elevated pressure of 20 atmospheres ensures that the coal gas is at a greater pressure than exists in the combustor of the gas turbine engine when injection occurs. This arrangement also reduces the size of the gasifier because of the higher density air supplied thereto and much of the energy contained in the hot coal gas which exits the gasifier can be recovered by expansion through the gas turbine engine. In addition, injection of the coal gas while still at elevated temperature prevents condensation of tars in the coal gas, which can cause serious contamination of various working components of the powerplant.

While manufactured coal gas can be effectively utilized in a gas turbine engine, this type of engine has limitations especially when used in relatively small sizes. Principal among these is lower than desired efficiency especially at reduced power output which occurs in a significant portion of powerplants used for mobile applications. Consequently, for mobile applications it is considered to be more desirable to use the producer gas to fuel a reciprocating engine.

The use of a gasifier to produce a low BTU coal gas to fuel a companion reciprocating engine can provide acceptable efficiency. While the energy content of coal gas produced is only about 100 to 200 BTU's per cubic foot (compared with natural gas whose energy content is about 1000 BTU's per cubic foot), this is not considered a serious problem if the coal gas is utilized immediately following its production in the gasifier. In addition, the coal gas can be cleaned of particulate matter and sulfur which naturally exist in the coal thus assuring adequate life and environmental acceptability for the exhaust products emitted from the engine.

To date, such powerplants have gasified the coal at relatively low pressures of about 1 atmosphere. After exiting the gasifier, the coal gas is cooled to near ambient temperature to condense and remove the tars. The particulates and sulfur in the coal gas are then removed by filtration and chemical reactions. The cooled and cleaned coal gas is then directed to the air intake system of a spark-ignited Otto-cycle or dual-fuel (i.e., ignited by pilot diesel fuel) gas engine.

Engines of this type which induct the fuel and intake air as a mixture during an intake phase of the engine cycle are susceptible to detonation or knock which can cause failure of the engine. In order to prevent these problems, these engines are compromised by deliberately limiting their power output and/or by operating them at relatively low compression ratios. The efficiency of the spark-ignited Otto-cycle engine is inferior to that of a diesel-cycle engine not only because of the Spark-ignited Otto-cycle engines' relatively lower compression ratios but also because they inherently experience throttling losses while operating at reduced power output.

The loss of available energy which occurs with the cooling of the producer fuel gas prior to cleaning and induction into the engine as well as the present use of engines which are less efficient than diesel-cycle engines result in a less-than-desired overall efficiency for this type of powerplant. In addition, the presently large size of the gasifier (which operates at ambient or low pressures) and associated heat exchangers make this type of powerplant too large and unattractive for use in mobile applications when compared with conventional diesel-cycle engines currently used.

The present invention is directed to overcoming one or more of the problems as set forth above.

DISCLOSURE OF THE INVENTION

In one aspect of the present invention a method of operating a high pressure gasifier and engine system is disclosed wherein the engine is a diesel-cycle internal combustion engine having an engine combustion chamber which, during an intake phase of the cycle, is adapted to admit therein a predetermined quantity of intake air, and which during a compression phase of the cycle and prior to a combustion phase, is adapted to compress that intake air to a predetermined first pressure comprising the steps of:

(a) compressing air to form compressed air at a predetermined second pressure which is greater than the first pressure;

(b) gasifying a non-gaseous source of fossil fuel with the compressed air at about the second pressure and thereby producing gaseous fuel at about the second pressure; and (c) injecting a predetermined quantity of that gaseous fuel at about the second pressure into the engine combustion chamber separately from the intake air admitted thereto.

In another aspect of the present invention a high pressure gasifier and engine system is disclosed comprising:

a diesel-cycle internal combustion engine having an engine combustion chamber which, during an intake phase of the cycle, is adapted to admit therein a predetermined quantity of intake air, and which during a compression phase of the cycle and prior to a combustion phase, is adapted to compress the intake air to a predetermined first pressure;

compressor means for compressing air to form compressed air at a predetermined second pressure which is greater than the first pressure; and gasifier means for gasifying non-gaseous fossil fuel, said gasifier means being arranged in intermittent fluid communication with the engine combustion chamber, said compressor means being arranged in fluid communication with the gasifier means and adapted to feed the compressed air at about the second pressure to the gasifier means to facilitate gasification and production of gaseous fuel at about the second pressure, said engine further including injection means for injecting the gaseous fuel at about the second pressure into the engine combustion chamber separately from the intake air admitted thereto.

The high pressure gasifier and diesel-cycle engine system of the present invention provides a power plant which is not only very efficient but also compact and therefore suitable for mobile applications.

BEST MODE FOR CARRYING OUT THE INVENTION

Figure 1:
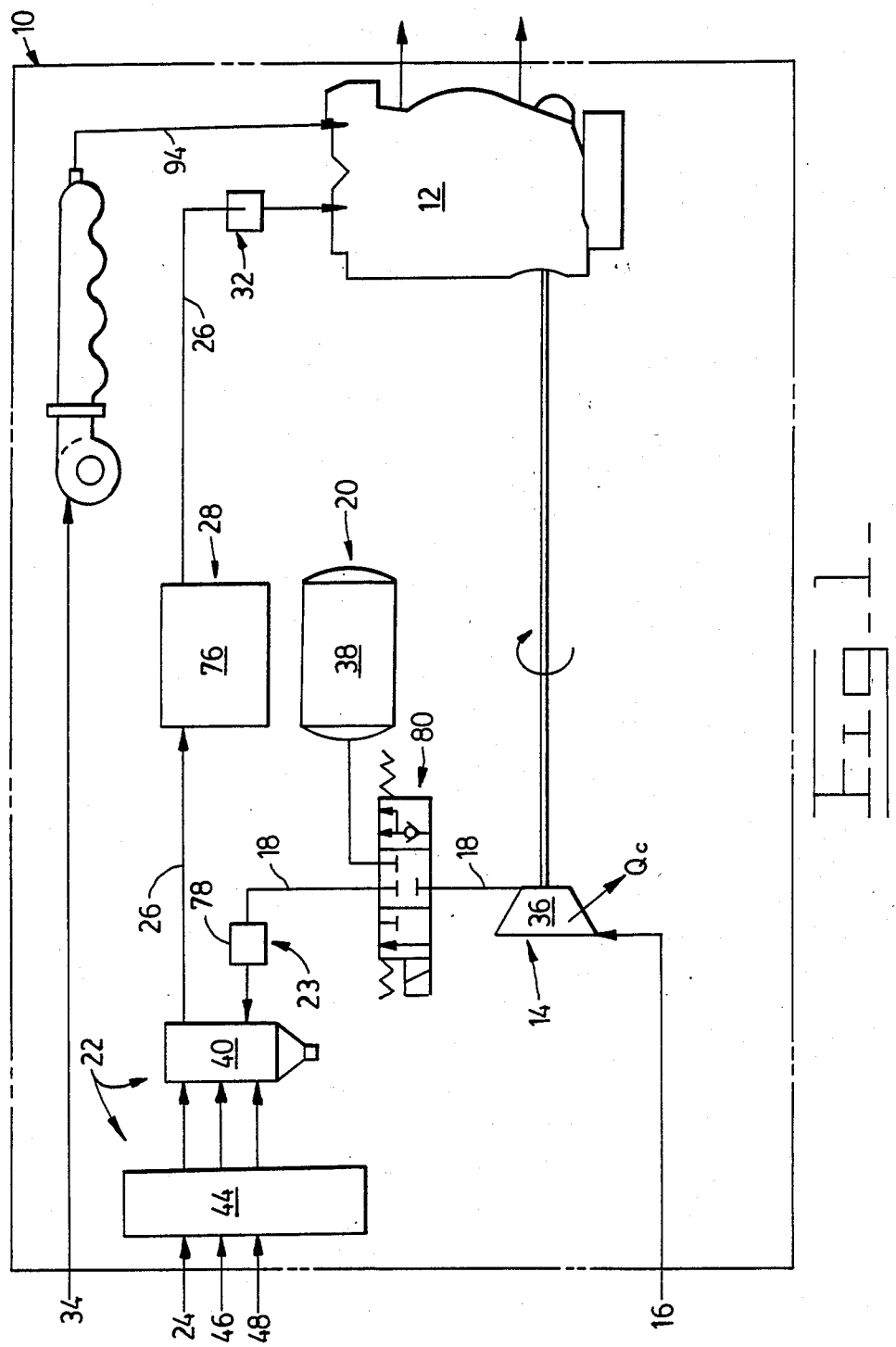
FIG. 1 is a diagrammatic view of one embodiment of the high pressure gasifier and engine system of the present invention.
Figure 2:
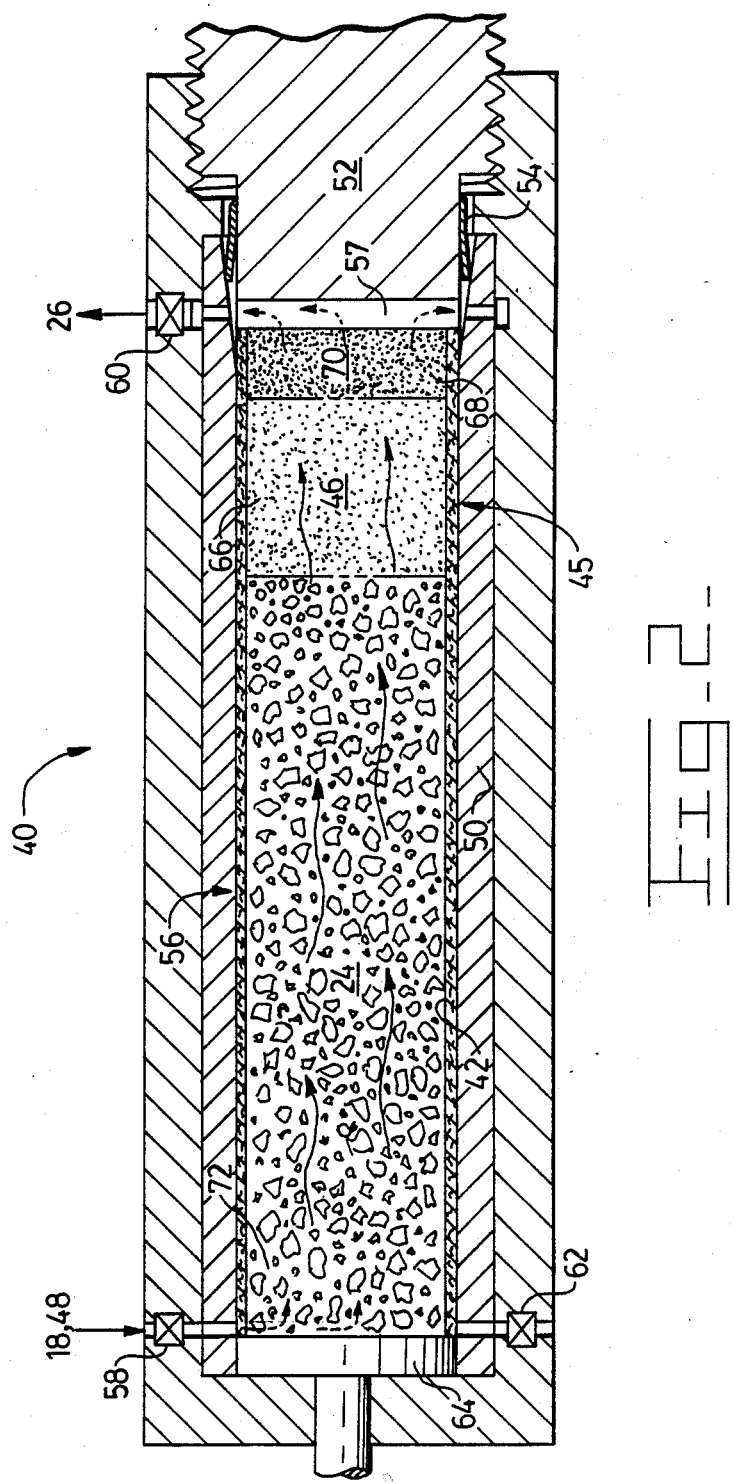
FIG. 2 is a diagrammatic, partial cross-sectional enlarged view of a first embodiment of the high pressure gasifier of the present invention.
Figure 3:
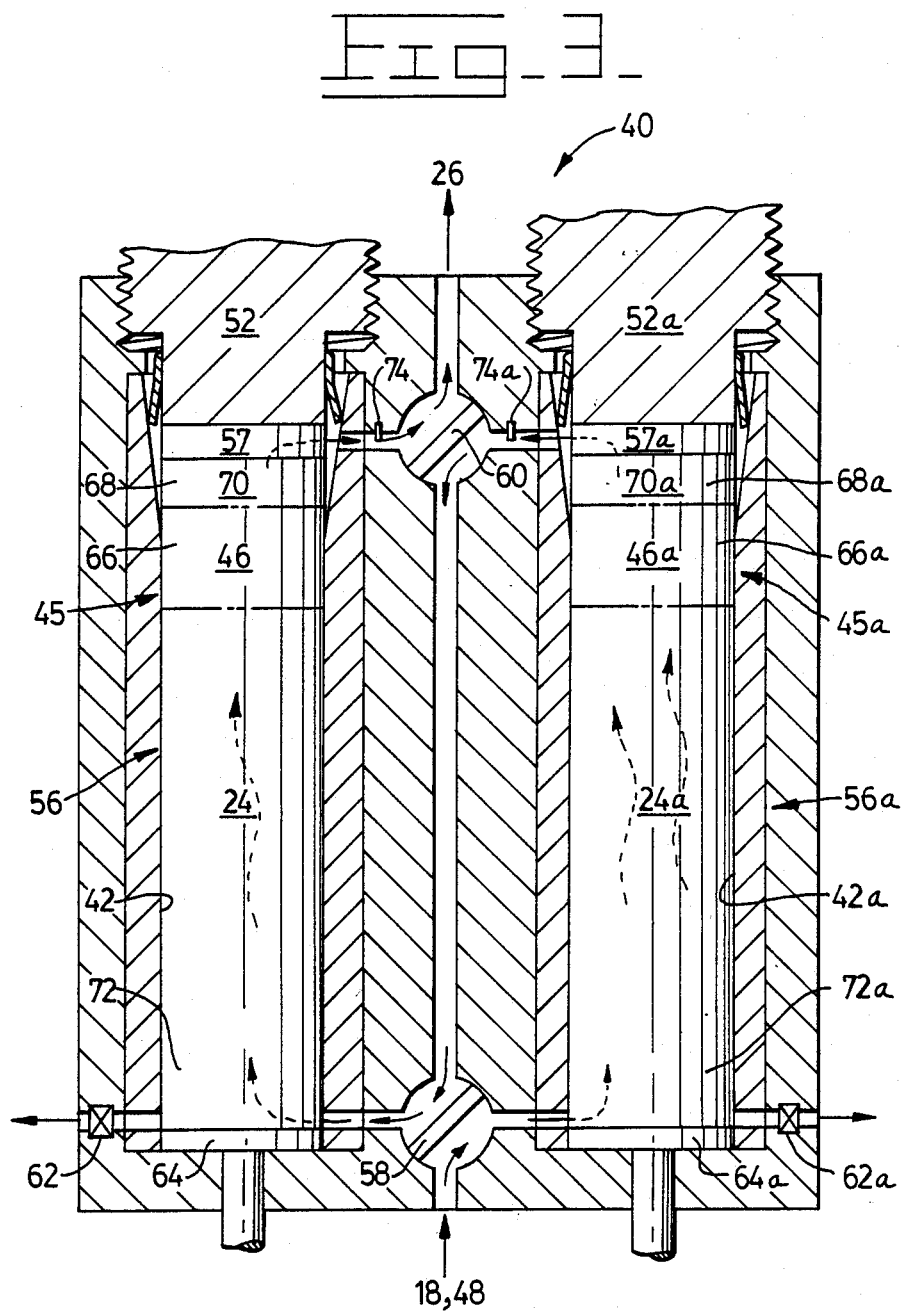
FIG. 3 is a diagrammatic, partial cross-sectional enlarged view of a second embodiment of the high pressure gasifier of the present invention.

Referring to FIGS. 1-3, wherein similar reference characters designate similar elements or features throughout these figures, there is shown two exemplary embodiments of the improved gasifier and engine system of the present invention. While the embodiments are illustrated and discussed with respect to gasifying coal, it should be kept in mind that other non-gaseous fossil fuels (such as coal tar, peat or heavy residual fuels) may be gasified instead.

In FIG. 1, the overall gasifier and engine system or powerplant 10 for both exemplary embodiments is schematically shown. The system 10 includes a diesel-cycle internal combustion engine 12, a compressor means 14 for compressing ambient or other air 16 into high pressure air 18, an air storage means 20 for storing and maintaining a predetermined amount of the high pressure air 18 produced by the compressor means 14, a gasifier means 22 for gasifying a source of non-gaseous fossil fuel 24 with the high pressure air 18 to thereby produce high-pressure fuel gas 26, an auxiliary ignition-initiating means 23 for initiating the gasification process during startup of the system 10 and a gas cleansing means or device 28 for cleansing the high-pressure fuel gas 26 produced by the gasifier means 22.

The engine 12 includes an engine combustion chamber and associated cylinder (not shown) as well as an injection means 32, such one or more timed gas admission valves, for injecting the high-pressure fuel gas 26 into the engine combustion chamber. During an intake phase of the diesel cycle, the engine combustion chamber is adapted to admit therein a predetermined quantity of intake air 34 which, for example, may be ambient air or supercharged air. During a compression phase of the cycle and prior to a combustion phase, the engine combustion chamber is adapted to compress the intake air 34 to a predetermined maximum pressure $P_1$. The injection means 32 is adapted to inject the high-pressure fuel gas 26 into the engine combustion chamber during a latter portion of the compression phase of the diesel cycle and just prior to the combustion phase. Preferably, the fuel gas is injected directly into an open combustion chamber of the engine 12 in the form of discreet high-velocity gas jets near top dead center of the compression phase. Alternatively, the fuel gas may be injected into a precombustion chamber of the engine. Regardless of the engine combustion chamber chosen, the engine 12 further includes a means 33 (not shown) for assisting ignition of the fuel gas 26. The ignition-assist means 33 may, for example be a spark plug or a glow plug projecting into the engine combustion chamber.

The compressor means 14 includes an air compressor 36 which is preferably of the multi-stage type and driven by the engine 12. The compressor 36 is adapted to compress the other air 16 to a predetermined second pressure $P_2$ which is greater than the first pressure $P_1$ periodically developed by the engine combustion chamber during the compression phase of the intake air 34. The second pressure $P_2$ is chosen to be of a magnitude sufficient so that the injected fuel gas can overcome the first pressure $P_1$ in the engine combustion chamber and result in adequate penetration and mixing throughout the intake air therein. For example, the magnitude of the second pressure $P_2$ may be chosen to be about 1.25 times the magnitude of the first pressure $P_1$. The compressor 36 is arranged to be in fluid communication with the gasifier means 22 and is adapted to feed its high pressure air 18 to the gasifier means 22 to facilitate gasification and production of the high-pressure fuel gas 26.

The air storage means 20 includes, for example, an air storage tank 38 arranged in fluid communication between the compressor means 14 and the gasifier means 22. The purpose of the air storage tank 38 is to reduce pressure fluctuations in the system 10 and to store and maintain a predetermined amount of the high-pressure air 18 for use in starting the system 10.

Gasification of coal at the very high pressures required for a diesel-cycle engine is far beyond the current state of the art of gasifiers because of mechanical and thermal problems presently encountered with the lock hopper valves used in conventional low pressure gasifiers. These problems are primarily caused by improper sealing of such valves which become contaminated by the coal and ash particles. However, the subject invention employs novel batch loading and in-bed conditioning features which help maintain a relatively clean environment in the gasifier and therefore ameliorate sealing of the critical inlet air, vent and exit gas valves. Batch loading of the gasifier is made possible by the use of these valves and periodic venting of the individual gasifier chambers. Batch loading is also made possible in the subject invention by the relatively much smaller size of the individual gasifier chambers due to the very high pressures at which the gasifier operates.

The gasifier means 22 includes a gasifier 40 having at least one gasifier chamber 42 (as shown in FIGS. 2 and 3), which is arranged in intermittent fluid communication with the compressor means 14 and also the engine combustion chamber. The gasifier means 22 also includes a material handling means 44 for intermittently feeding a predetermined charge of non-gaseous fossil fuel 24, high pressure air 18 and perhaps other necessary materials 46,48 (such as limestone and water) to the gasifier chamber 42 and intermittently removing any residual material (such as ash) from the gasifier chamber 42 after gasification of that charge is completed. The gasifier means 22 also includes a conditioning means 45 for conditioning the produced coal gas to remove particulates and/or sulfur before the coal gas exits the gasifier chamber 42.

The gasifier chamber 42 might be of any of the conventional types, reduced appropriately in size. However, a fixed bed gasifier chamber is preferred because it can use larger size coal and because it produces less particulates in the exiting fuel gas stream and because such particulates are larger and therefore easier to remove. More importantly, fixed-bed gasifiers are amenable to the use of batch loading and in-bed conditioning features.

Regardless of the type of gasifier chamber 42 chosen, the conditioning means 45 may include apparatus which feeds water to the gasifier chamber in order to control the chemical composition of the fuel gas as well as the gasifier temperatures. The conditioning means 45 may also include apparatus for feeding limestone, lime, or other calcium-containing material 46 along with the coal 24 in order to neutralize any sulfur contained in the coal. The calcium reacts with the sulfur to form calcium sulfide (CaS) which may be further oxidized (in the gasifier 40 or following removal from the gasifier) to the more stable calcium sulfate ($CaSO_4$). There are some indications in the published literature that the calcium/sulfur reaction is enhanced by operating the gasifier 40 at the relatively high pressure of about $P_2$. Because the gasifier is greatly reduced in size, it may also be preferable to feed the discreet charges of coal and limestone, if required, into the gasifier 40 in the form of prepared cartridges or capsules.

FIG. 2 illustrates a first embodiment of the gasifier 40 having the aforementioned gasifier chamber 42. The gasifier chamber 40 includes a liner 50 composed of a heat resistant insulating material such as partially stabilized zirconia. A closure 52 and seal 54 are used to seal the entrance of the gasifier chamber 42 following insertion of a fresh coal cartridge 56. The closure 52 includes a porous end portion 57 which, when the gasification chamber entrance is sealed by the closure, permits egress of the fuel gas (26) from the gasification chamber 42 but not egress of the solid material therein including the inert material comprising filter 70. Inlet valve 58 controls the inlet of high pressure air 18 (supplied by the compressor means 14) into the chamber 42 while outlet valve 60 controls the exit of generated coal gas 26 from the gasifier chamber 42. Vent valve 62 is used to vent the gasifier chamber 42 to permit ejection of ash by an axially-movable ejector 64 and insertion of a fresh coal cartridge 56.

Each fresh coal cartridge 56 primarily includes granulated coal 24 but may also include the conditioning means 45 as an integral part thereof. In this example, the conditioning means 45 includes granulated limestone 46 located at the gas exit end portion of the cartridge as shown generally at 66. Alternatively, the granulated limestone 46 and coal 24 may be arranged as a homogeneous mixture within the coal cartridge 56. Moreover, the conditioning means 45 further includes a relatively small expendable filter 70 located at a further gas exit end portion 68 of the cartridge 56. The filter 70 is composed of granulated inert material, such as sand, to filter particulate material from the fuel gas 26 exiting the gasifier chamber 40. The conditioning means 45 helps ensure that the exiting coal gas is relatively clean so as not to undermine the sealability of the gasifier chamber 40 when it operates at high pressure. The conditioning means 45 described above also facilitates easy disposal of the residual products of gasification remaining in the gasifier chamber. The granulated material of a fresh cartridge 56 may, for example, be already compressed, cemented or otherwise strengthened to maintain its shape and wrapped with reinforced paper to prevent abrasion. The coal cartridges 56 are stored and automatically fed to the gasifier chamber 42 by suitable conveyors (not shown).

Following insertion of a fresh coal cartridge 56, closure 52 is closed and secured, vent valve 62 is closed and inlet valve 58 is opened to admit high pressure air 18 from the compressor means 14. When the pressure in the gasifier chamber 42 reaches, for example, about 20 mega-Pascals (MPa), equivalent to 200 bar or 200 atmospheres, the outlet valve 60 is opened and high pressure air 18 begins to flow through the porous material of the cartridge 56 and pass out through the outlet valve 60 and then to the injection means 32 of the engine 12. For startup, the coal located at the air entrance end portion 72 of the cartridge 56 is ignited by injecting high pressure natural gas from a suitable storage tank (not shown) into the high pressure air 18 as it passes through a small auxiliary combustion chamber 78 containing an energized glow plug or other ignition-assist device (not shown).

Following ignition of the granulated coal, an ignition and burning zone passes through the coal cartridge 56 from left to right (according to FIG. 2) similar to what occurs in a burning cigar. Consequently, the high pressure air 18 passing through the ash initially formed at the left-hand portion of the cartridge 56 is pre-heated, the granulated coal is gasified in the gasifier chamber 42 and the hot high-pressure coal gas 26 pre-heats the granulated coal and vaporizes the coal liquids. As the reaction zone progresses, the ejector 64 moves to the right (according to FIG. 2) keeping the ash slightly compressed. Water 48 is injected into the entering high pressure air 18 as required for the gasifier reaction.

Following conversion of all the coal, the ejector 64 axially moves all the way to the right and the ash, reacted limestone and filter material, remain in the gasifier chamber 42 which at this time is filled with more high pressure air 18. Inlet valve 58 and outlet valve 60 are then closed. Vent valve 62 is then opened to reduce the pressure inside the gasifier chamber 42 to ambient pressure, the residual material is ejected and a fresh cartridge 56 inserted into the gasifier chamber 42.

FIG. 3 shows a second alternative embodiment of the gasifier means 22 having a gasifier 40 which includes at least two gasifier chambers 42 and 42a to permit alternate ejection and loading of those chambers. In addition, the coal gas exiting the first cartridge 56 undergoing gasification is directed to pass through the second fresh coal cartridge 56a. As the first cartridge 56 nears the end of its burning phase, the exiting hot coal gas 26 ensures ignition of the second cartridge 56a as soon as sufficient oxygen is introduced in the second gasifier chamber 42a. When the first cartridge 56 is finally burned out, the drop in temperature of the exiting coal gas 26 is sensed by a thermocouple 74 and the inlet valve 58 is rotated through 90 degrees thus effectively isolating the first gasifier chamber 42. Vent valve 62 is opened to relieve the pressure in the first gasifier chamber 42 and ejection and reload then automatically occurs as previously described. Thermocouple 74a, outlet valve 60, and vent valve 62a operate in concert with the previously mentioned components to effect ejection and reload of the second gasifier chamber 42a.

The rate of progression of the reaction zone through each coal cartridge 56,56a is controlled by the availability of oxygen. Assuming that the compressor means 14 supplies the air at a reasonably stable pressure, the flow of oxygen (air) entering the coal cartridge 56, 56a is dependent on the flow of produced coal gas to the engine 12 which is in turn controlled by an engine governor (not shown). Thus the gasifier and engine system 10 is self-regulating. In order to conserve fuel, it may be desirable to reduce the pressure of the compressor means 14 (and consequently the pressure of the gasifier means 22) at low engine output.

As mentioned earlier, water 48 can be injected as required to form steam which may be needed for the gasification process. Control of water injection, ejection, and reload and other necessary functions are preferably controlled by a suitable electronic control device (not shown). Preferably, this electronic control device also controls the timing and duration of fuel gas injection into the engine 12 as well as other engine functions.

Preliminary calculations indicate that a coal cartridge 8 inches in diameter and 36 inches long can fuel a 3 megawatt engine for about one minute at rated engine output. This duration is long enough to facilitate practical ejection and reload sequences of coal cartridges 56 into the gasifier chamber 42. The coal cartridge 56 would, of course, operate the engine 12 for much longer periods at reduced engine load. Alternatively the discreet charges of coal and/or other materials may be metered directly into the gasifier chamber 42.

The gas cleansing means 28 includes a gas cleansing device 76 whose function is to condition the high-pressure fuel gas 26 by removing most particulates and chemically neutralizing any noxious gases. The gas cleansing device may include, for example, a zinc ferrite pellet bed through which the hot coal gas 26 is passed. The zinc ferrite pellet bed is used for sulfur removal, in lieu of limestone placed in the fixed bed gasifier chamber 42, or to remove any residual sulfur in the coal gas 26 even if limestone is used. If limestone is used in the fixed bed gasifier chamber 42, the coal gas might be alternately passed through two pellet beds. While one pellet bed is used to capture the sulfur, the other is regenerated by passing steam through that pellet bed. The steam removes the absorbed sulfur by creating sulfur dioxide ($SO_2$) and this is passed in concentrated form back through the limestone in the fixed bed gasifier chamber 42 for effective reaction with the calcium. This latter arrangement is well known in the art.

If a conventional gasifier is used or if the porous filter 70 in the coal cartridge 56 is not completely effective in removing all particulates which are deleterious to the engine 12, one or two cyclone stages may be used to remove particulates produced by the gasifier. It is also well known in the art that porous ceramic filters of the wall flow type can effectively remove particulates. More importantly, it has been found that particulates can be effectively removed from the filters by back flushing. This tends to agglomerate the ash into larger particles for effective removal by a cyclone filter. This arrangement has been used to effectively agglomerate diesel engine exhaust soot although such diesel soot is not completely removed from the filters by the back flow process. Regardless of the type of wall flow filter, the very high density of the coal gas permits the filter to be relatively small without incurring excessive pressure drop.

Industrial Applicability

A major advantage of carrying out gasification at about 20 MPa evolves from the fact that the air is about 200 times as dense as it is at atmospheric pressure, assuming the same temperature. Consequently, the volume of the gasifier 40 may be reduced by approximately the same ratio. This is very important where the gasifier and engine system 10 is to be used as a power plant for a locomotive or other mobile application. In addition, only the air required for the gasifier 40 is compressed. The coal, water and limestone, if used, are added to the gasifier 40 in solid or liquid form which requires much less energy than would be required if these materials were first converted to gas. The additional moles of gas generated in the gasifier 40 causes an increased gas flow which is effectively used for penetration and mixing of the intake air 34 when injected into the modified diesel-cycle engine 12.

The gasifier and engine system 10 is started by opening the valve from the air storage tank 38. The air storage tank was previously closed when the engine 12 was shut down in order to maintain its air pressure at about 20 MPa. This high pressure air 18a flows from the air storage tank 38 to a relatively small auxiliary combustion chamber 78 wherein natural gas or methane from a high pressure bottle is injected. The gas/air mixture is ignited by a sparkplug or glow plug (which would have been pre-heated prior to the start sequence). Combustion products from the auxiliary combustion chamber 78 then enter the gasifier chamber 42, 42a and pass through the fresh coal cartridge 56. Upon exiting the gasifier chamber 42, the combustion products pass through the gas cleansing means 28 and are then injected directly into the engine combustion chambers by the injection means 32. This action cranks the diesel engine 12 similar to the manner in which some conventional engines are started with compressed air.

As the flow of hot combustion products of the natural gas/air combustion continue to pass through the gasifier chamber 42, the coal cartridge 56 ignites and gasification of the coal occurs as previously described. The coal gas thus generated is burned in the engine combustion chambers resulting in an increase in engine speed.

Following sustained operation of the engine 12 on coal gas, the natural gas valve is closed and the startup ignition system de-activated. Operation of the engine 12 at normal speeds then drives the direct-connected compressor 36, air is compressed to return the pressure in the air storage tank 38 to about 20 MPa, and the self-sustained operation of the system is established.

It is apparent that the high pressure natural gas bottle would have to be periodically replaced or recharged. An alternative to the use of natural gas would be the incorporation of a readily ignitable material such as a solid propellant, in the initial coal cartridge used for starting and provision of a suitable ignition device. When ignited, the readily ignitable material should be capable of producing a temperature which is sufficiently high to ignite the coal.

When the engine 12 is shut down, a valve 80 at the air storage tank 38 is closed to maintain the tank pressure at a level sufficient for the next starting sequence.

It is apparent that a direct gas injection engine requires fuel gas at pressure significantly greater than the compression pressure of the diesel engine to assure rapid penetration and mixing of the gas jets with the compressed intake air in the combustion chamber. Since the fuel gas 26 produced by the gasifier 40 is already at a relatively higher pressure $P_2$, injection of the high pressure fuel gas near top dead center in a direct gas injection diesel-cycle engine with glow plug ignition results in performance quite similar to a conventional diesel-cycle liquid fuel injection engine.

Because the gas burns almost immediately upon injection, there is no accumulation of fuel gas in the combustion chamber as in the case of Otto-cycle gas engines where the fuel gas is inducted with the intake air during an intake phase of the Otto cycle. With the conventional gas engine, part of the gas/air mixture, so-called "end gas", may detonate near the end of the combustion phase. This detonation can cause failure of the engine in a very short time and requires the engine to incorporate a lower than desired compression ratio which results in reduced efficiency and/or operates at a reduced specific power output compared with a diesel engine. These problems are eliminated by direct gas injection utilized in the present invention. This is especially desirable when using coal gas because this gas typically contains hydrogen gas which is very prone to detonation.

Other aspects, objects, and advantages of this invention can be obtained from a study of the drawings, the disclosure, and the appended claims.

What is claimed:

1. A method of operating a high pressure gasifier and engine system wherein said engine is a diesel-cycle internal combustion engine having an engine combustion chamber which, during an intake phase of the cycle, is adapted to admit therein a predetermined quantity of intake air, and which during a compression phase of the cycle and prior to a combustion phase, is adapted to compress the intake air to a predetermined maximum first pressure comprising the steps of:
    (a) compressing air to form compressed air at a predetermined second pressure which is greater than said first pressure;
    (b) gasifying a non-gaseous source of fossil fuel with said compressed air at about the second pressure and thereby producing gaseous fuel at about the second pressure; and
    (c) injecting a predetermined quantity of said gaseous fuel at about the second pressure into said engine combustion chamber separately from said intake air during about a latter half of the compression phase of the diesel cycle.

2. The method of claim 1 further including the step of intermittently feeding the fossil fuel into a gasification chamber in which the gasifying step occurs.

3. A method of operating a high pressure gasifier and engine system wherein said engine is a diesel-cycle internal combustion engine having an engine combustion chamber which, during an intake phase of the cycle, is adapted to admit therein a predetermined quantity of intake air, and which during a compression phase of the cycle and prior to a combustion phase, is adapted to compress the intake air to a predetermined maximum first pressure comprising the steps of:
    (a) compressing air to form compressed air at a predetermined second pressure which is greater than said first pressure;
    (b) gasifying a non-gaseous source of fossil fuel with said compressed air at about the second pressure and thereby producing gaseous fuel at about the second pressure;
    (c) injecting a predetermined quantity of said gaseous fuel at about the second pressure into said engine combustion chamber separately from said intake air during about a latter half of the compression phase of the diesel cycle; and
    (d) maintaining a predetermined quantity of compressed air at about said second pressure for use in the gasifying step and cranking the engine during startup of the gasifier and engine system.

4. A method of operating a high pressure gasifier and engine system, said engine being a diesel-cycle internal combustion engine having a cylinder and associated combustion chamber which, during an intake phase of the cycle, is adapted to admit therein a predetermined quantity of intake air, and which during a compression phase of the cycle and prior to a combustion phase, is adapted to compress said intake air and thereby generate a predetermined maximum first pressure, and which following the combustion phase and during an expansion phase is adapted to reduce pressure therein and extract work from expanding gas in the cylinder, and which during an exhaust phase is adapted to remove products of combustion from the cylinder, said gasifier having a gasifier chamber which is arranged in intermittent fluid communication with the engine combustion chamber, comprising the steps of:

(a) compressing other air, separate from the intake air, to form compressed air at a predetermined second pressure which is greater than said first pressure;

(b) intermittently feeding the gasifier chamber with the compressed air at the second pressure and a predetermined charge of non-gaseous fossil fuel;

(c) gasifying the fossil fuel charge by partially burning it with the compressed air at about the second pressure, said gasifying step thereby producing gaseous fuel at about the second pressure;

(e) injecting a predetermined quantity of said gaseous fuel at about the second pressure directly into said engine combustion chamber, separately from the intake air, during about a latter half of the compression phase of the diesel cycle; and (f) intermittently removing any residual fossil fuel from the gasifier chamber after said gasifying step is completed for that charge.

5. A high pressure gasifier and engine system comprising:

a diesel-cycle internal combustion engine having an engine combustion chamber which, during an intake phase of the cycle, is adapted to admit therein a predetermined quantity of intake air, and which during a compression phase of the cycle and prior to a combustion phase, is adapted to compress the intake air to a predetermined maximum first pressure;

compressor means for compressing air to form compressed air at a predetermined second pressure which is greater than said first pressure; and gasifier means for gasifying a source of non-gaseous fossil fuel, said gasifier means being arranged in intermittent fluid communication with the engine combustion chamber, said compressor means being arranged in fluid communication with the gasifier means and adapted to feed the compressed air at about the second pressure to the gasifier means to facilitate gasification and production of gaseous fuel at about the second pressure, said engine further including injection means for injecting the gaseous fuel at about the second pressure directly into the engine combustion chamber at a preselected time during about the latter half of the compression phase of the cycle.

6. The high pressure gasifier and engine system of claim 5 wherein said second pressure is greater than about 20 MPa (200 bar).

7. The high pressure gasifier and engine system of claim 5 wherein the magnitude of said second pressure is about 1.25 times the magnitude of said first pressure.

8. The high pressure gasifier and engine system of claim 5 wherein the source of fossil fuel is coal.

9. A high pressure gasifier and engine system comprising:

a diesel-cycle internal combustion engine having an engine combustion chamber which, during an intake phase of the cycle, is adapted to admit therein a predetermined quantity of intake air, and which during a compression phase of the cycle and prior to a combustion phase, is adapted to compress the intake air to a predetermined maximum first pressure;

compressor means for compressing air to form compressed air at a predetermined second pressure which is greater than said first pressure; and gasifier means for gasifying a source of non-gaseous fossil fuel, said gasifier means being arranged in intermittent fluid communication with the engine combustion chamber, said compressor means being arranged in fluid communication with the gasifier means and adapted to feed the compressed air at about the second pressure to the gasifier means to facilitate gasification and production of gaseous fuel at about the second pressure, said engine further including injection means for injecting the gaseous fuel at about the second pressure directly into the engine combustion chamber at a preselected time during the compression phase of the cycle, said gasifier means further including material handling means for batch loading a predetermined charge of non-gaseous fossil fuel to the gasifier chamber for gasification and intermittently removing residual material from the gasifier chamber after gasification of that charge is completed.

10. A high pressure gasifier and engine system comprising:

a diesel-cycle internal combustion engine having an engine combustion chamber which, during an intake phase of the cycle, is adapted to admit therein a predetermined quantity of intake air, and which during a compression phase of the cycle and prior to a combustion phase, is adapted to compress the intake air to a predetermined maximum first pressure;

compressor means for compressing air to form compressed air at a predetermined second pressure which is greater than said first pressure;

gasifier means for gasifying a source of non-gaseous fossil fuel, said gasifier means being arranged in intermittent fluid communication with the engine combustion chamber, said compressor means being arranged in fluid communication with the gasifier means and adapted to feed the compressed air at about the second pressure to the gasifier means to facilitate gasification and production of gaseous fuel at about the second pressure, said engine further including injection means for injecting the gaseous fuel at about the second pressure directly into the engine combustion chamber at a preselected time during the compression phase of the cycle; and air storage means for maintaining a predetermined amount of compressed air at about said second pressure for starting the gasifier and engine system, said air storage means being arranged in intermittent fluid communication between the compressor means and the gasifier means.

11. A high pressure gasifier and engine system comprising:

a diesel-cycle direct injection internal combustion engine having an engine combustion chamber which, during an intake phase of the cycle, is adapted to admit therein a predetermined quantity of intake air, and which during a compression phase of the cycle and prior to a combustion phase, is adapted to compress said intake air to a predetermined maximum first pressure;

compressor means for compressing other air, separate from said intake air, to form compressed other air at a predetermined second pressure which is greater than said first pressure; and gasifier means for gasifying a predetermined charge of non-gaseous fossil fuel, said gasifier means having a gasifier chamber arranged in intermittent fluid communication with the open combustion chamber, said compressor means being arranged in intermittent fluid communication with the gasifier chamber and adapted to periodically feed said compressed other air to the gasifier chamber to facilitate gasification and production of gaseous fuel at about the second pressure, said engine further including injection means for injecting the gaseous fuel at about the second pressure into the engine combustion chamber separate from the intake air during about a latter half of the compression phase.

12. A high pressure gasifier and engine system comprising:

a diesel-cycle internal combustion engine having an engine combustion chamber which, during an intake phase of the cycle, is adapted to admit therein a predetermined quantity of intake air, and which during a compression phase of the cycle and prior to a combustion phase, is adapted to compress the intake air to a predetermined maximum first pressure;

compressor means for compressing air to form compressed air at a predetermined second pressure which is greater than said first pressure; and gasifier means for gasifying a source of non-gaseous fossil fuel, said gasifier means being arranged in intermittent fluid communication with the engine combustion chamber, said compressor means being arranged in fluid communication with the gasifier means and adapted to feed the compressed air at about the second pressure to the gasifier means to facilitate gasification and production of gaseous fuel at about the second pressure, said engine further including injection means for injecting the gaseous fuel at about the second pressure directly into the engine combustion chamber at a preselected time during the compression phase of the cycle, said gasifier means including a gasifier chamber having conditioning means for conditioning the fuel gas produced therein to remove particulates prior to the fuel gas exiting the gasifier chamber, said conditioning means including an expendable filter of granulated inert material located in a gas exit end portion of the gasifier chamber.

13. The high pressure gasifier and engine system of claim 12 wherein said granulated inert material is sand.

* * * * *